Jan. 23, 1940. R. E. WALSH 2,188,069
CUTTING TORCH HEAD
Filed May 7, 1938
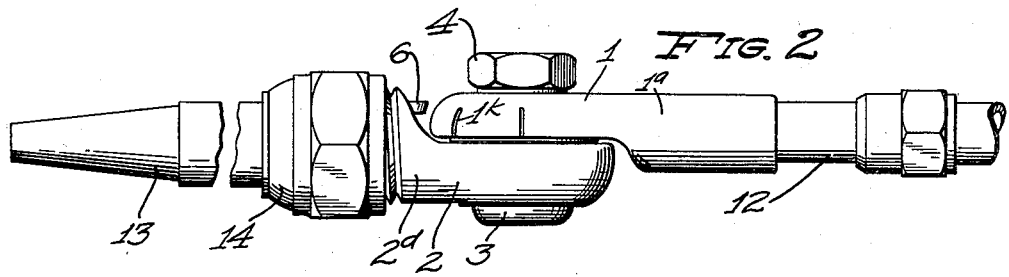
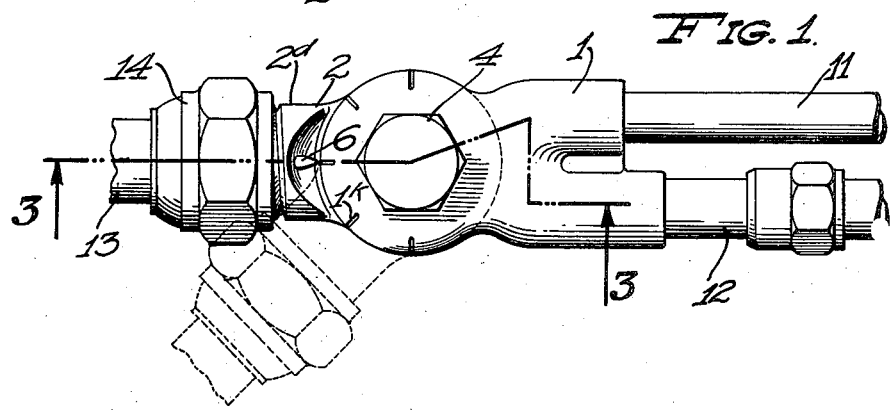
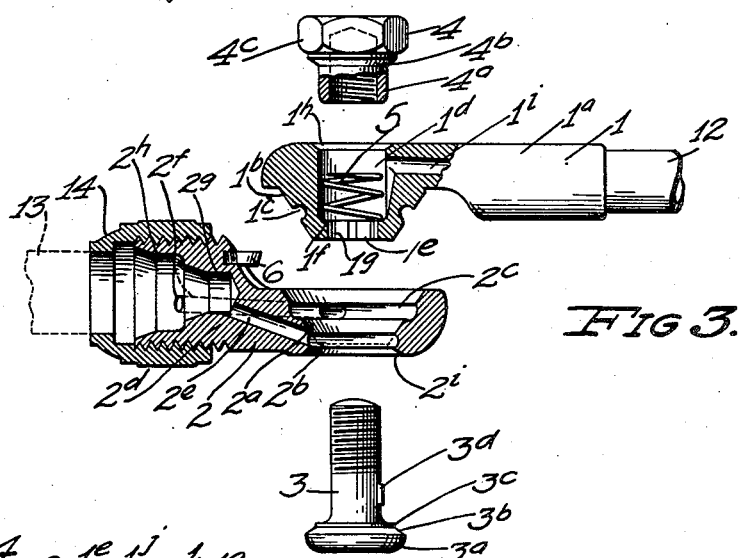
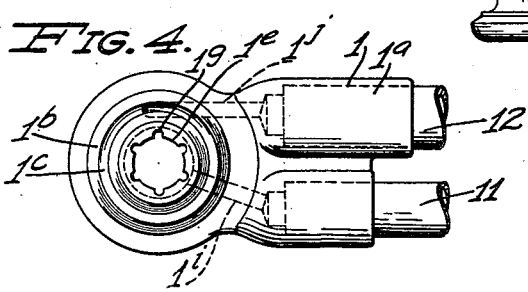
INVENTOR.
ROBERT E. WALSH
BY *William E. Hall*
ATTORNEY Patented Jan. 23, 1940

2,188,069

UNITED STATES PATENT OFFICE 2,188,069

CUTTING TORCH HEAD

Robert E. Walsh, Carpenteria, Calif.

Application May 7, 1938, Serial No. 206,583

3 Claims. (Cl. 158—27.4)

My invention relates to a cutting torch head.

One of the principal objects of this invention is to provide a relatively flat and small pivoted head so that it may be readily inserted into or manipulated in small openings, and in which the joints between the pivoted members are tightly sealed even though the head is small or flat.

Another important object of this invention is to provide novel tapered or cone joints between pivoted members in a head of this class.

An object also is the provision of novel and simple means for resiliently holding the head members together and also resiliently and frictionally locking the nut.

With these and other objects in view, as will appear hereinafter, I have devised a cutting torch head having certain novel features of construction, as will be hereinafter described in detail and particularly set forth in the appended claims, reference being had to the accompanying drawing, and to the characters of reference thereon, which form a part of this application, in which:

Fig. 1 is a side view of my cutting torch head showing the cutting nozzle and the air and gas tubes fragmentarily, the view showing by dotted lines the nozzle member shifted to an angular position;

Fig. 2 is an edge view thereof;

Fig. 3 is an exploded view showing the pivoted members and the nut partly in section to facilitate the illustration, the section of the parts being taken substantially on the line 3—3 of Fig. 1; and, Fig. 4 is a face view of the inner side of the handle or stationary head member.

My cutting torch head, as illustrated in the drawing, is intended to form a part of and to be constructed in a conventional cutting torch grip or handle, adjacent the nozzle end of the tool. The conventional torch handle consists of two tubes, an air or oxygen conducting tube 11 and an acetylene conducting tube 12 which are connected by a nozzle supporting head for supporting the nozzle 13. My head, the substance of this invention, is substituted for the conventional head.

This head, as shown, consists essentially of a handle or stationary head member 1, a movable or nozzle head member 2, a bolt 3, nut 4, and a spring 5.

The stationary head member has at one end portion or at the outer side a lateral extension $1^a$ to which the tubes 11 and 12 are secured. The opposite or inner end of the head member 1 has a cone surface $1^b$ having intermediate its extremities an annular groove $1^c$. The head member has a central bore $1^d$ concentric with the cone surface. The inner end of the bore is reduced, providing a concentric bolt opening $1^e$ for the reception of the shank of the bolt 3. The portion having the bolt opening provides a shoulder $1^f$ at the inner side. The inner wall of the latter portion has longitudinal grooves $1^g$. At the outer end of the bore is a cone seat $1^h$, which will be referred to hereafter. The tubes 11 and 12, connected to the head 1, communicate respectively with the bore $1^d$ and the groove $1^c$ through passages $1^j$ and $1^i$.

The pivotal or nozzle supporting head member 2 has a cone shaped bore $2^a$ into which fits the cone $1^b$ of the member 1. This cone shaped bore has two annular grooves $2^b$ and $2^c$, respectively at the small end and intermediate the ends of the cone bore. The groove $2^c$ registers with the groove $1^c$, while the groove $2^b$ communicates with the bore $1^d$ through the longitudinal grooves $1^g$.

This head member 2 has a lateral extension $2^d$ to which the conventional nozzles 13 may be removably secured by a nut 14. The grooves $2^b$ and $2^c$ are connected, respectively, through passages $2^e$ and $2^f$ with chambers $2^g$ and $2^h$ within the lateral extension or arm $2^d$, these chambers and the nozzle connection being the same as in the conventional construction.

At the outer side of the head and concentric with the cone shaped bore is an oppositely directed cone seat $2^i$.

The bolt 3 extends concentrically through the bores of the head members 1 and 2 with the head $3^a$ at the outer side of the head member 2. The inner side of the head has a cone surface $3^b$ which engages the seat $2^i$. Inwardly from the cone surface $3^b$ is a cylindrical collar $3^c$ which locates the bolt within the bore of the head member 2. The nut 4 is secured to the end of the bolt and is provided with a shank or sleeve $4^a$ which is located within the bore $1^d$. The nut is also provided with a cone surface $4^b$ at the inner side of the head $4^c$, which cone surface engages the cone seat $1^h$. Within the bore $1^d$ is also positioned the compression spring 5 which exerts a tension between the bolt and the nut and also resiliently forces the cone surface $1^b$ into the cone shaped bore $2^a$. The bolt is provided, adjacent the head, with a key $3^d$ which is adapted to enter one of the longitudinal grooves $1^g$, thereby locking the bolt relative to the stationary head member, and reducing to a minimum the possibility of loosening the bolt and nut. This construction permits of the use of a round and relatively flat head $3^a$ and a relatively flush construction for one side of the head.

The cone surfaces at the inner sides of bolt and nut provide efficient seals against the escape of gases from the head.

The axes of the arms or lateral extensions 1ᵃ and 2ᵈ are substantially in alignment with each other and with the external joint between the head members, causing such arms or extensions to be offset, as shown. In the offset portion of the head member 2 is a projection or pointer 6 which is directed toward and terminates adjacent the outer side of the head member 1 which is concentric with the pivotal axis of the latter. On this outer surface are radial marks 1ᵏ which provide angle or degree indications toward which the pointer 6 may be directed for setting the nozzle supporting head member at the desired angle with respect to the stationary head member.

Though I have shown and described a particular construction, I do not wish to be limited to the same, but desire to include in the scope of my invention the construction substantially as set forth in the appended claims.

I claim:

1. In a cutting torch head, a pair of pivoted head members, the first having a transverse opening consisting of an axial bore reduced at one end to provide a coaxial bolt opening and terminating at its other end in a coaxial cone seat, the wall forming the reduced bolt opening having a plurality of longitudinal passages, said head member having a coaxial exterior cone surface at the end portion of the reduced bore and a coaxial annular groove in and between the extremities of the cone surface, said member having at the other end portion a lateral extension having spaced passages joining respectively with the bore and the groove, the second head member having a cone shaped bore, in which is seated said cone surface and also provided with a cone seat at the outside and at the small end of the bore, said cone shaped bore having spaced annular grooves in and between the extremities of the surface of the bore, the groove at the larger diameter end of the cone shaped bore registering with the groove of the first member, and the second groove of the second member communicating with the bore of the first member through said longitudinal passages, the second head member having also a lateral extension provided with spaced passages communicating respectively with the grooves, a bolt extending coaxially through said bores and having a cone portion at the underside of its head seated in the cone seat of the second member, and also having a key extending into one of the longitudinal passages of the first member as a key seat, and a nut for the shank of the bolt and having at the inner side thereof a cone portion seated in the cone seat of the first member, and also having a reduced shank inwardly therefrom fitting the bore of the first member.

2. In a cutting torch head, a pair of pivoted head members, the first having a transverse opening consisting of an axial bore reduced at one end to provide a coaxial bolt opening and terminating at its other end in a coaxial cone seat, the wall forming the reduced bolt opening having a plurality of longitudinal passages, said head member having a coaxial exterior cone surface at the end portion of the reduced bore and a coaxial annular groove in and between the extremities of the cone surface, said member having at the other end portion a lateral extension having spaced passages joining respectively with the bore and the groove, the second head member having a cone shaped bore, in which is seated said cone surface and also provided with a cone seat at the outside and at the small end of the bore, said cone shaped bore having spaced annular grooves in and between the extremities of the surface of the bore, the groove at the larger diameter end of the cone shaped bore registering with the groove of the first member, and the second groove of the second member communicating with the bore of the first member through said longitudinal passages, the second head member having also a lateral extension provided with spaced passages communicating respectively with the grooves, a bolt extending coaxially through said bores and having a cone portion at the underside of its head seated in the cone seat of the second member, and also having a key extending into one of the longitudinal passages of the first member as a key seat, a nut for the shank of the bolt and having at the inner side thereof a cone portion seated in the cone seat of the first member, and also having a reduced shank inwardly therefrom fitting the bore of the first member, and a spring in the bore of the first member between the inner end of the shank of the nut and the shoulder formed at the reduced bolt opening.

3. In a cutting torch head, a pair of pivoted head members, the first having a transverse opening consisting of an axial bore reduced at one end to provide a coaxial bolt opening, the wall forming the reduced bolt opening having a plurality of longitudinal passages, said head member having a coaxial exterior cone surface at the end portion of the reduced bore and coaxial annular groove in and between the extremities of the cone surface, said member having at the other end portion a lateral extension having spaced passages joining respectively with the bore and the groove, the second head member having a cone shaped bore, in which is seated said cone surface, said cone shaped bore having spaced annular grooves in and between the extremities of the surface of the bore, the groove at the larger diameter end of the cone shaped bore registering with the groove of the first member, and the second groove of the second member communicating with the bore of the first member through said longitudinal passages, the second head member having also a lateral extension provided with spaced passages communicating respectively with the grooves, a bolt extending coaxially through said bores and provided with a head engaging the side of the second head member having the smaller diameter of the cone shaped bore, said bolt being keyed to the first member, and a nut for the shank of the bolt, said nut engaging the side of the first member having the end of the bore opposite the reduced end, said nut having also a reduced shank inwardly therefrom fitting the bore of the first member.

ROBERT E. WALSH.